United States Patent [19]

Ngo

[11] Patent Number: 5,282,094

[45] Date of Patent: Jan. 25, 1994

[54] CURRENT MIRROR HAVING A BASE CURRENT COMPENSATION CIRCUIT WITH A COMPENSATION MIRROR AND A VOLTAGE CLAMP

[75] Inventor: Tuan V. Ngo, Eden Prairie, Minn.

[73] Assignee: VTC Inc., Bloomington, Minn.

[21] Appl. No.: 67,671

[22] Filed: May 26, 1993

Related U.S. Application Data

[62] Division of Ser. No. 957,612, Oct. 6, 1992.

[51] Int. Cl.⁵ .......................... G11B 5/09; G11B 5/02
[52] U.S. Cl. ...................................... 360/46; 360/67
[58] Field of Search .......................... 360/46, 67, 68;
330/252, 278, 280, 288, 294, 306, 257, 256, 253, 261; 323/273, 315, 316; 333/143; 307/304, 270, 443, 446, 475, 530, 261, 355, 296.6, 296.8; 455/260; 328/133

[56] References Cited

U.S. PATENT DOCUMENTS

| | | | |
|---|---|---|---|
| 2,996,349 | 8/1961 | Mauch | 346/74 |
| 4,045,694 | 8/1977 | Ahmed | 307/296.6 |
| 4,302,718 | 11/1981 | Schade, Jr. | 330/288 X |
| 4,551,772 | 11/1985 | Sliger | 360/46 |
| 4,639,794 | 1/1987 | Ferrier | 360/46 |
| 4,714,901 | 12/1987 | Jain et al. | 307/296.8 X |
| 4,757,274 | 7/1988 | Bowers | 330/261 X |
| 4,779,061 | 10/1988 | Matthies | 330/228 |
| 4,785,259 | 11/1988 | Seelbach et al. | 330/253 X |
| 4,843,342 | 6/1989 | Hester et al. | 330/257 |
| 4,853,800 | 8/1989 | Schulz | 360/46 |
| 4,879,520 | 11/1989 | Cotreau | 330/257 |
| 4,890,072 | 12/1989 | Espe et al. | 328/133 X |
| 4,914,533 | 4/1990 | Meunier | 360/67 |
| 4,952,866 | 8/1990 | Van Tuijl | 307/261 X |
| 4,952,867 | 8/1990 | Anderson et al. | 330/288 X |
| 5,184,090 | 2/1993 | Anzai | 360/67 X |

OTHER PUBLICATIONS

*Microelectronics*, Jacob Millman, (1979), A Biasing Technique and Current Repeaters, pp. 537–540.
*Analysis and Design of Analog Integrated Circuits*, Paul R. Gray and Robert G. Meyer, (1984), Transistor Current Sources and Active Loads, pp. 241–246.
*Analysis and Design of Analog Integrated Circuits*, Paul R. Grey and Robert G. Meyer, (1984), Supply-Independent Biasing, pp. 275–280.
*IBM Technical Disclosure Bulletin*, J. A. Bailey, R. G. Black, Jr., and J. Lewkowics, Predriver for "H" Configured Write Driver for Magnetic Recording, vol. 23, No. 11, Apr. 1981, pp. 5167–5168.

Primary Examiner—Donald Hajec
Assistant Examiner—Patrick Wamsley
Attorney, Agent, or Firm—Kinney & Lange

[57] ABSTRACT

A base current compensation circuit is configured for connection to a first current mirror that has lost base current. The compensation circuit includes a compensation mirror coupled in a feedback loop to the first current mirror. A current sensing transistor senses the lost base current. A current duplicating mirror is coupled to the current sensing transistor and generates a compensation current in response to the sensed lost base current. The compensation current is fed back into the first current mirror to compensate for the lost base current. A voltage clamp is coupled to the current sensing transistor and the current duplicating transistor. The voltage clamp maintains approximately equal collector-base voltages in the current sensing transistor and the current duplicating transistor to increase accuracy of the compensation mirror.

14 Claims, 2 Drawing Sheets

CURRENT MIRROR HAVING A BASE CURRENT COMPENSATION CIRCUIT WITH A COMPENSATION MIRROR AND A VOLTAGE CLAMP

BACKGROUND OF THE INVENTION

This is a division of application Ser. No. 07/957,612, filed Oct. 6, 1992.

The present invention relates to a magnetic head read/write preamplifier within a magnetic storage system. In particular, the present invention relates to a write driver circuit within the read/write preamplifier which is capable of applying a maximum voltage swing across a magnetic head in the magnetic storage system.

A magnetic storage system includes a magnetic head which reads and writes information on a recording surface of a magnetic media, such as a magnetic disk. The magnetic head includes an inductive coil which reads and writes the information by sensing or creating a changing magnetic field. A read/write preamplifier is connected to the magnetic head at first and second head contacts. The preamplifier includes read circuitry and write circuitry for controlling the read and write operations.

The write circuitry includes a write current driver circuit which is connected across the head contacts. During write mode operation, the write driver circuit forces a relatively large write current through the inductive coil to create a magnetic field that polarizes adjacent bit positions on the recording surface. Digital information is stored by reversing the polarization of selected bit positions which is done by reversing the direction of the current flow in the inductive coil.

A typical write driver circuit includes an "H-switch" for controlling the direction of current flow through the inductive coil. The H-switch includes upper write switching ("pull-up") transistors and lower write switching ("pull-down") transistors. The upper write switching transistors are connected between a first supply voltage and the head contacts. The lower write switching transistors are connected between the head contacts and a second supply voltage through a write current sink. The write current sink includes a write current control transistor connected in series with a resistor.

The write driver circuit controls the direction of current flow through the inductive coil by driving selected transistors in the H-switch between ON and OFF states. The write driver circuit applies a limited voltage swing across the head contacts for reversing current flow and polarizing the adjacent bit position.

The rate at which information can be stored on a recording surface through the magnetic head is directly proportional to the rate at which the direction of current can be reversed in the inductive coil. The rise/fall time of the inductive coil is determined by:

$$di/dt = V/L \qquad \text{Eq. 1}$$

where di/dt is the rate of change of the current over time across the inductive coil, V is the available voltage across the inductive coil, and L is the load, which is an inductance. Therefore, the speed of the H-switch is directly proportional to the available voltage across the inductive coil.

The available voltage is determined by subtracting the voltage drops across the pull-up transistors, the pull-down transistors and the write current sink from the supply voltage. The available voltage is shown below:

$$V_{supply} - [V_{be}(pull\text{-}up) + V_{sat}(pull\text{-}down) + V_{be}(sink) + VR1(sink)] \qquad \text{Eq. 2}$$

where:

$V_{supply}$ is the power supply voltage;

$V_{be}$ (pull-up) is the turn on voltage at the pull-up transistor operating as an emitter follower, which is about 0.8 V;

$V_{sat}$ (pull-down) is the saturation voltage drop across the pull-down transistor, which is about 0.4 V;

$V_{be}$ (sink) is the turn on voltage of the write current control transistor in the write current sink, which is about 0.8 V; and VR1 is the voltage drop across the resistor in the current sink, which is about 0.4 V.

Therefore, the maximum voltage swing available across the inductive coil is: $V_{supply} - 2.4$ volts. For a preamplifier with a 5-volt supply, the available voltage swing is only 2.6 volts.

The available voltage at the load is increasingly significant in today's applications. As storage systems become more and more compact, there is a greater need for more compact voltage supplies. As a result, voltage capacity is often sacrificed to achieve a more compact voltage supply.

Portable computers are now available which operate on a 3.3 volt supply. With the conventional H-switch discussed above, the available voltage swing across the inductive coil in a 3.3 volt system is only 0.9 volts. Since switching speed is directly proportional to the available voltage swing, the use of a more compact 3.3 volt voltage supply results in a significant reduction in switching speed. A conventional H-switch supplies an inadequate amount of voltage at the load to store information effectively with a 3.3 volt power supply.

Non-synchronous switching is another problem with conventional H-switches. Conventional H-switches have two branches, each sending current through the load in a direction opposite the other branch. Non-synchronous switching between the two branches causes spiking and current overshoot at the load. This is especially a problem when fast NPN transistors are used to control the switching, as their speed makes them difficult to synchronize.

An additional problem with the conventional H-switch is the relatively large voltage swings generated at the head contacts during the write mode operation. Because current through the load (which is an inductor) cannot change instantaneously, the voltage swings have a tendency to rise above their forcing voltage causing a voltage spike. In the conventional H-switch this is particularly a problem because of the relatively low breakdown voltages of the switching transistors. The voltage spike occurs between the source and the load which corresponds to the base-emitter junction of the switching transistor. Typically these junctions breakdown at only 6 volts.

There is a continuing need to improve write driver circuits which increase the maximum voltage available at the load to improve overall switching speed and improve overall switching characteristics.

SUMMARY OF THE INVENTION

The present invention is a write preamplifier for driving a magnetic head in a magnetic storage system. The write preamplifier supplies a maximum voltage across the magnetic head to maximize the speed at which the preamplifier can switch current direction in the magnetic head.

The write preamplifier of the present invention is connected between first and second voltage supply terminals and includes first and second data input terminals for receiving data input signals and first and second head contact terminals for connection to a magnetic head. The write preamplifier further includes a predriver current source connected to the second supply terminal, which generates a predriver current.

A predriver circuit having first and second predriver current paths is connected between the first supply terminal and the predriver current source. The first and second predriver current paths are connected to the first and second data input terminals, respectively, such that the data input signals control the flow of predriver current through the first and second predriver current paths.

A write driver circuit is connected between the first and second supply terminals. The write driver circuit includes first and second write current paths connected across the head contact terminals. The write current paths direct a write current through the head contact terminals in opposite directions. The first and second write current paths are connected to the first and second predriver current paths, respectively, in a current-mirror configuration to mirror the predriver current in the predriver circuit into the write current in the write driver circuit.

The first write current path includes a pull-up transistor connected to the first head contact and a pull-down transistor connected to the second head contact. The second write current path includes a pull-up transistor connected to the second head contact and a pull-down transistor connected to the first head contact. The predriver current in the first and second predriver current paths is mirrored into the pull-up transistors in the first and second write current paths, respectively.

In one embodiment, the switching of the pull-down transistors in the first and second write current paths are also controlled by the current mirror between the predriver circuit and the write driver circuits. This configuration synchronizes the switching between the pull-up and pull-down transistors to reduce current spiking at the head contacts and increase switching speed.

In another embodiment, switching of the pull-down transistors is controlled by a bias circuit connected to the data input terminals. The bias circuit is also configured to synchronize switching between the pull-up and pull-down transistors.

In another embodiment of the present invention, the current mirror includes a base compensation circuit to compensate for any current loss in the current mirror.

DETAILED DESCRIPTION OF THE PREFERRED EMBODIMENTS

The write preamplifier of the present invention applies a maximum voltage swing across the magnetic head in the magnetic storage system. The write preamplifier includes a predriver circuit which develops a predriver current in a first predriver current path or in a second predriver current path as a function of the data to be written in the magnetic storage system. The predriver current is mirrored into a write driver circuit which is connected across the magnetic head. The write driver circuit applies a write current in either a first or a second direction as a function of the current in the first and second predriver current paths.

Figure 1:
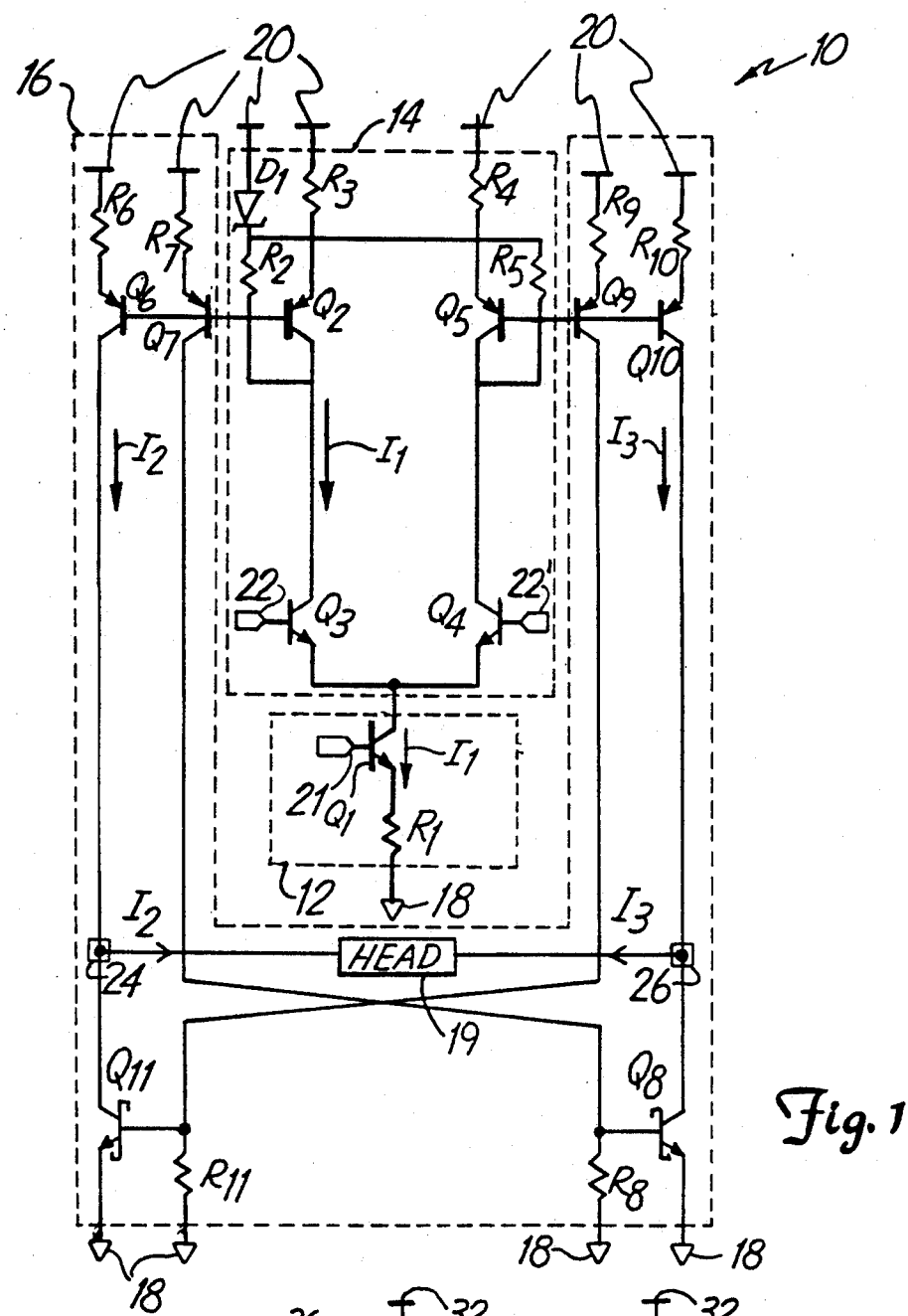
FIG. 1 is a schematic illustration of a write driver circuit in accordance with the present invention.

FIG. 1 is a schematic illustration of write preamplifier 10 and is one embodiment of the present invention. Write preamplifier 10 includes predriver current generating circuit 12, predriver circuit 14 and write driver circuit 16. Predriver current generating circuit 12 is connected between predriver circuit 14 and voltage supply terminal 18. Predriver circuit 14 is connected between predriver current generating circuit 12, and voltage supply terminal 20. Write driver circuit 16 is connected between voltage supply terminal 20 and voltage supply terminal 18. Write driver circuit 16 is connected across magnetic head 19 to control the direction of current flow through magnetic head 19 during write mode operation.

Predriver current generating circuit 12 includes preamplifier select terminal 21, transistor Q1, and resistor R1. Transistor Q1 has a collector connected to predriver circuit 14, a base connected to preamplifier select terminal 21, and an emitter connected to resistor R1. Resistor R1 is connected between the emitter of transistor Q1 and voltage supply terminal 18.

Predriver current generating circuit 12 generates predriver current I1. In one embodiment, transistor Q1 is a T10NW($\times$1.5) and resistor R1 is a 118 ohm resistor. The value of resistor R1 can be selected to generate a desired predriver current I1. Predriver current I1 is enabled or disabled by preamplifier select signals received on preamplifier select terminal 21. For example, write preamplifier 10 may be disabled during read mode operation.

Predriver circuit 14 includes current sensing transistors Q2 and Q5, current control transistors Q3 and Q4, resistors R2, R3, R4, and R5, and Schottky-diode D1. Transistors Q2 through Q5 each have a collector, a base, and an emitter.

Resistor R3 is connected between voltage supply terminal 20 and the emitter of current sensing transistor Q2. The collector of current sensing transistor Q2 is connected to the collector of current control transistor Q3. The base of current control transistor Q3 is connected to data input terminal 22 and the emitter is connected to the collector of transistor Q1 in predriver current generating circuit 12.

Resistor R4 is connected between voltage supply terminal 20 and the emitter of current sensing transistor Q5. The collector of current sensing transistor Q5 is connected to the collector of current control transistor Q4. The base of current control transistor Q4 is connected to data input terminal 22' and the emitter is connected to the collector of transistor Q1 in the predriver current generating circuit 12. Data input terminals 22 and 22' receive complementary data signals from a disc drive controller (not shown).

The base of current sensing transistor Q2 is connected to the collector of current sensing transistor Q2. Resistor R2 is connected between the base of transistor Q2 and the cathode of Schottky-diode D1. The anode of Schottky-diode D1 is connected to supply terminal 20. The base of current sensing transistor Q5 is connected to the collector of current sensing transistor Q5. Resistor R5 is connected between the base of transistor Q5 and the cathode of Schottky-diode D1.

Predriver circuit 14 has first and second predriver current paths. The first predriver current path includes resistor R3, current sensing transistor Q2, and current control transistor Q3. The second predriver current path includes resistor R4, current sensing transistor Q5, and current control transistor Q4.

Predriver current I1 generated by predriver current generating circuit 12 flows through either the first or second predriver current path as a function of the complementary data signals applied to data input terminals 22 and 22'.

For example, if the data input signals on data input terminal 22 are HIGH and the data input signals on input terminal 22' are LOW, current control transistor Q3 will be ON and current control transistor Q4 will be OFF. Therefore, predriver current I1 will flow through predriver current generation circuit 12 and through the first predriver current path defined by resistor R3 and transistors Q2 and Q3. Similarly, if the data input signals on data input terminal 22 are LOW and the data input signals on data input terminal 22' are HIGH, current control transistor Q3 will be OFF and current control transistor Q4 will be ON. Predriver current I1 will flow through the second predriver current path defined by resistor R4, current sensing transistor Q5 and current control transistor Q4.

Current sensing transistors Q2 and Q5 are PNP-type transistors. Since PNP-type transistors are relatively slow compared to NPN-type transistors, the predriver circuit 14 includes a base discharge circuit formed by Schottky-diode D1 and resistors R2 and R5. The base discharge circuit discharges the bases of current sensing transistors Q2 and Q5 to increase the switching speed of the transistors.

Write driver circuit 16 includes first and second write current paths. The first write current path is defined by resistor R6, pull-up transistor Q6, magnetic head 19, and pull-down transistor Q8. The first write current path applies write current I2 through magnetic head 19 in a first direction.

The second write current path is defined by resistor R10, pull-up transistor Q10, magnetic head 19, and pull-down transistor Q11. The second current path applies write current I3 through magnetic head 19 in a second direction, opposite to the first direction. Write driver circuit 16 applies a write current through magnetic head 19 by selectively applying write currents I2 and I3 through the first and second write currents paths, respectively.

In the first write current path, resistor R6 is connected between voltage supply terminal 20 and the emitter of pull-up transistor Q6. The base of pull-up transistor Q6 is connected to the base of transistor Q7 and to the base of current sensing transistor Q2 of predriver circuit 14. The collector of pull-up transistor Q6 is connected to head contact terminal 24. The collector of pull-down transistor Q8 is connected to head contact terminal 26. The emitter of pull-down transistor Q8 is connected to voltage supply terminal 18 and the base is connected to resistor R8 and to the collector of transistor Q7.

In the second write current path, resistor R10 is connected between voltage supply terminal 20 and the emitter of pull-up transistor Q10. The base of pull-up transistor Q10 is connected to the base of transistor Q9 and to the base of current sensing transistor Q5 of predriver circuit 14. The collector of pull-up transistor Q10 is connected to head contact terminal 26. The collector of pull-down transistor Q11 is connected to head contact terminal 24. The emitter of pull-down transistor Q11 is connected to voltage supply terminal 18 and the base is connected to resistor R11 and to the collector of transistor Q9.

The first write current path and the first predriver current path are connected in a "mirror" or "current repeater" configuration through pull-up transistor Q6, and current sensing transistor Q2. When transistors Q6 and Q2 are matched transistors with substantially equal current gains, the collector currents (predriver current I1 and write current I2) will be substantially similar.

In another embodiment, the current mirror amplifies the predriver current into the write driver circuit. By scaling the emitter areas of transistors Q6 and Q2 appropriately, various ratios between predriver current I1 and write driver current I2 may be achieved. For example, write driver current I2 may be ten times that of predriver current I1. In this embodiment, power will not be wasted in predriver circuit 14 in order to establish a sufficient write driver current to properly operate magnetic head 19.

Similarly, the second predriver current path and second write current path are connected in a mirror configuration through current sensing transistor Q5 and pull-up transistor Q10. Thus, predriver current I1 is mirrored into the second write current path in the same way that it is mirrored into the first write current path.

Write currents I2 and I3 flow through the first and second write current paths as a function of the current in predriver circuit 14. Current flows through the first or second predriver current paths as a function of the complementary data signals applied to data input terminals 22 and 22'. Thus, current flow in the first and second write current paths is also a function of the complementary data signals.

For instance, as in the above example, where data input signals on data input terminal 22 are HIGH and the data input signals on input terminal 22' are LOW, current control transistor Q3 is ON and current control transistor Q4 is OFF. Thus, predriver current I1 flows through the first predriver current path. Under these conditions, the bases of transistors Q2 and Q6 are LOW. Since transistors Q2 and Q6 are all PNP-type transistors, a LOW signal at their bases turns them ON. The mirror configuration of transistors Q2 and Q6 mirrors predriver current I1 in the collector of current sensing transistor Q2 into the first write current path to establish write current I2 in the collector of pull-up transistor Q6. Since data input terminal 22' is LOW, current control transistor Q4 is OFF which turns OFF transistors Q5 and Q10. Thus, no current will flow in the second write current path. Write current I2 will flow through magnetic head 19 in a first direction from pull-up transistor Q6 to pull-down transistor Q8.

If the data input signals on data input terminals 22 and 22' are reversed so that the signal on data input terminal 22 is LOW and the signal on data input terminal 22' is HIGH, current control transistor Q3 will be OFF and current control transistor Q4 will be ON. Under these conditions, predriver current I1 will flow through the second predriver current path and no current will flow in the first predriver current path. Thus, the current mirror consisting of transistors Q5 and Q10 will mirror predriver current I1 into the second write current path. Write current I3 will flow through magnetic head 19 in a second direction, opposite to the first direction, from pull-up transistor Q10 to pull-down transistor Q11.

Since synchronous switching is important in write preamplifiers, a bias circuit is connected to the base of each of the pull-down transistors to ensure synchronous switching. The bias circuits for the bases of pull-down transistors Q8 and Q11 are also operated through current sensing transistors Q2 and Q5 of predriver circuit 14. The bias circuit for pull-down transistor Q8 includes resistor R7, transistor Q7 and resistor R8. Transistor Q7 is connected in a current mirror configuration with current sensing transistor Q2. Resistor R7 is connected between voltage supply 20 and the emitter of transistor Q7. The collector of transistor Q7 is connected to resistor R8 and to the base of pull-down transistor Q8. Resistor R8 is also connected to voltage supply terminal 18.

In operation, when current sensing transistor Q2 and current control transistor Q3 are both ON, predriver current I1 flows through the first predriver current path and is mirrored into the first write current path. Predriver current I1 is also mirrored into the collector current of transistor Q7. Since transistor Q7 turns ON, it pulls the base of pull-down transistor Q8 HIGH. Transistor Q8 turns ON allowing write driver current I2 to flow through magnetic head 19 in the first direction.

Similarly, the bias circuit for pull-down transistor Q11 includes resistor R9, transistor Q9, and resistor R11. Transistor Q9 is connected in a mirror configuration with current sensing transistor Q5. Resistor R9 is connected between voltage supply terminal 20 and the emitter of transistor Q9. The collector of transistor Q9 is connected the base of pull-down transistor Q11 and to resistor R11. Resistor R11 is also connected to voltage supply terminal 18.

In the above-example where transistors Q2 and Q3 are ON and transistors Q4 and Q5 are OFF, transistor Q9 will be OFF and no current will flow through its collector. The base of pull-down transistor Q11 is pulled LOW through resistor R8. Transistor Q11 is therefore OFF.

Similarly, when predriver current I1 flows in the second predriver current path (through transistors Q4 and Q5), transistor Q9 will be ON while transistor Q7 will be OFF. The base of pull-down transistor Q8 will be pulled LOW turning it OFF, while the base of pull-down transistor Q11 will be pulled HIGH which will turn it ON. Write current I3 will flow through magnetic head 19 in the second direction, opposite to the first direction.

The current-mirror biasing using resistor R7, transistor Q7, and resistor R8 along with resistor R9, transistor Q9, and resistor R11 ensure that the switching of pull-down transistors Q8 and Q11 is fast, accurate, and synchronized with the switching of pull-up transistors Q6, and Q10. This reduces the likelihood of current spiking and current overshoot at magnetic head 19.

Figure 2:
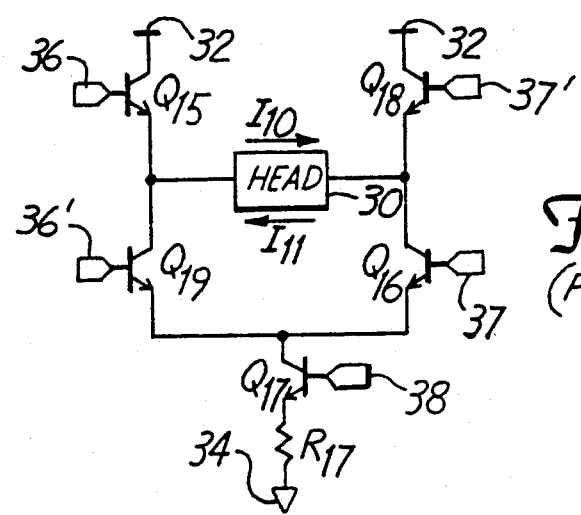
FIG. 2 is a schematic illustration of a known H-switch write preamplifier.

The common-emitter configuration of pull-up transistors Q6 and Q10 and pull-down transistors Q11 and Q8 greatly improves previous problems of relatively low break-down voltage in prior art configurations. In the conventional H-switch (as shown in FIG. 2) switching was controlled by transistors configured as common-collectors or as emitter followers. When voltage swings in the inductors of these H-switches rose above their forcing voltages causing a voltage spike, the transistors tended to break down. This was due to the fact that in the emitter following configuration the base-emitter junction broke down at only 6 volts. In the present invention, transistors Q6, Q9, Q11, and Q9 are all configured as common-emitters and operate in the saturation region so that break-down for the collector-base junction is 20 volts. Thus, the transistors in the present invention tolerate much larger voltage spikes without experiencing break down.

The present invention has the advantage over the prior art in that the voltage needed to operate transistors Q1 through Q5 no longer substracts from the voltage available to the magnetic head. The maximum voltage available at magnetic head 19 is:

$$VCC - [VR6 = V_{sat}(Q6) = V_{sat}(Q8)] \qquad \text{Eq. 3}$$

where:

VCC is the power supply voltage at terminal 20;
VR6 is the voltage drop across R6 (about 0.15 volts);
$V_{sat}(Q6)$ is the saturation drop across pull-up transistor Q6 (about 0.4 volts); and
$V_{sat}(Q8)$ is the saturation drop across pull-down transistor Q8 (about 0.3 volts).

For a voltage supply of 5 volts, the available voltage across the magnetic head is about ±4.15 volts. This is slightly more than twice the available voltage at the magnetic head than is typically available using previous H-switch configurations. For a voltage supply of 3.3 volts, the available voltage across the magnetic head is ±2.45 volts. Thus, unlike the conventional H-switch, the present invention would be effective with a 3.3 volt supply source.

In one embodiment of the present invention, PNP-type transistors are used for pull-up transistors Q6 and Q10, transistors Q7 and Q9, and for current sensing transistors Q2 and Q5. Although PNP-type transistors are generally slower switches than NPN-type transistors, there use in the present invention is acceptable for two reasons. First, the PNP-type transistors are preferably formed in a complementary bipolar process (CBP). The PNP-type transistors formed from this process are faster than previously used NPN-type transistors formed in a linear high density (LHD) process. Secondly, degeneration resistors R6, R7, R3, R4, R9, and R10 and a base discharge circuit (consisting of Schottky-diode D1 and resistors R2 and R5) were used to increase the switching speed of the PNP-type transistors. The base discharge circuit limits the base voltage swings of the current mirrors, which aids in rapid switching.

Pull-down transistors Q11 and Q8 are saturating Schottky-clamped NPN-type transistors. These type of transistors have the advantage that they operate at saturation and, thus, have very little voltage gain. Transistors Q11 and Q8, being Schottky-clamped, do not go deep into saturation. Transistors Q11 and Q8 can, therefore, be turned OFF much more rapidly than conventional NPN-type transistors that are in deep saturation.

To further increase the switching rate of pull-down transistors Q11 and Q8, base discharge circuits are connected to pull-down transistors Q11 and Q8. Resistor R11 and resistor R8 are connected to the bases of pull-down transistors Q11 and Q8, respectively.

In one embodiment of the present invention, pull-up transistors Q6 and Q10 are TVPA35(×2), pull-down transistors Q11 and Q8 are TPWR5(×2), transistor Q1 of predriver circuit 14 is a T10NW(×1.5), transistors Q7 and Q9 and current sensing transistors Q2 and Q5 are TVPA(16), and current control transistors Q3 and Q4 are T10NW(×1.5). Resistor R1 is 118 ohms, resistors R6 and R10 are 10 ohms, Resistors R2 and R5 are 250 ohms, resistors R7, R3, R4, and R9 are 100 ohms, and resistors R11 and R8 are 1000 ohms. The supply voltage is 5 volts while the select signal on preamplifier select terminal 21 is 1.25 volts.

FIG. 2 shows a conventional "H-switch" write driver as used in previously known systems. The H-switch write driver includes a first head current path and a second head current path which drive first and second head currents I10 and I11 through magnetic head 30 in opposite directions.

The first head current path is defined by transistor Q15, magnetic head 30, transistor Q16, transistor Q17, and resistor R17. Transistor Q15 is an NPN-type transistor with an emitter, a base, and a collector. The collector of transistor Q15 is connected to voltage supply 32 and the emitter is connected to magnetic head 30. The base is connected to data terminal 36. Transistor Q16 is an NPN-type transistor having a collector, a base and an emitter. The collector of transistor Q16 is connected to magnetic head 30, and the emitter is connected to the collector of transistor Q17. The base of transistor 16 is connected to data signal 37. Transistor Q17 is an NPN-type transistor with a collector, a base, and an emitter. The collector of transistor Q17 is connected to the emitter of transistor Q16. The emitter of transistor Q17 is connected to resistor R17 and the base is connected to select terminal 38. Resistor R17 is connected between the emitter of transistor Q17 and voltage supply terminal 349

The second head current path is defined by transistor Q18, magnetic head 30, transistor Q19, transistor Q17, and resistor R17. Transistor Q18 is an NPN-type transistor with a collector, a base and an emitter. The collector of transistor Q18 is connected to voltage supply 32 and the emitter is connected to magnetic head 30. The base of transistor Q18 is connected to data terminal 37. Transistor Q19 is an NPN-type transistor with a collector, a base, and an emitter. The collector of transistor Q19 is connected to magnetic head 30 and the emitter is connected to the collector of transistor Q17. The base of transistor Q19 is connected to data terminal 36'.

In operation, the head current is driven through magnetic head 30 in the direction of either head current I10 or head current I11 as a function of data signals applied to data terminals 36, 36', 37 and 37'. The complement of the data signal applied to data terminals 36 and 37 is applied to data terminals 36' and 37'. Transistor Q17 and resistor R17 set up the head current when the preamplifier is selected through select terminal 38. If the data signal on data terminals 36 and 37 is HIGH, transistors Q15 and Q16 will be ON, while transistors Q18 and Q19 will be OFF. Transistors Q15 and Q16 drive head current I10 through magnetic head 30 in a first direction. If the data signal applied to data terminals 36 and 37 is LOW, transistors Q15 and Q16 will be OFF, while transistors Q18 and Q19 will be ON. Transistors Q18 and Q19 drive head current I11 through magnetic head 30 in a second direction, opposite the first direction.

The head current in the H-switch write driver can be shut down using select terminal 38. When select terminal 38 is LOW, transistor Q17 will be OFF. Under these conditions, no current will flow through magnetic head 30 and the H-switch write driver will be completely shut down. When the signal at select terminal 38 is HIGH, then transistor Q17 will be ON to set up the head current.

In the conventional H-switch configuration shown in FIG. 2, the maximum voltage available across magnetic head 30 is:

$$VCC - [V_{be}(Q15) + V_{sat}(Q16) + V_{sat}(Q17) + VR17] \quad \text{Eq. 4}$$

where:
- $V_{be}(Q15)$ is the voltage drop across transistor Q15 (about 0.8 volts);
- $V_{sat}(Q16)$ is the saturation voltage drop across transistor Q16 (about 0.4 volts);
- $V_{sat}(Q17)$ is the saturation voltage drop across transistor Q17 (about 0.4 volts); and
- VR17 is the voltage drop across resistor R17 (about 0.4 volts).

With a 5 volt supply voltage, the available voltage across magnetic head 30 is only ±3 volts. In practice, the available voltage may be even less due to margins for manufacturing tolerances, temperature, and supply voltage. Since switching speed is proportional to the available voltage across the magnetic head, the conventional H-switch write driver provides much slower switching than the present invention. In addition, if the conventional H-switch write driver is used with the newer 3.3 volt supplies, the available voltage will only be about 0.3 volts. Thus, conventional H-switch write drivers cannot be used effectively with the newer 3.3 volt voltage supplies.

Figure 3:
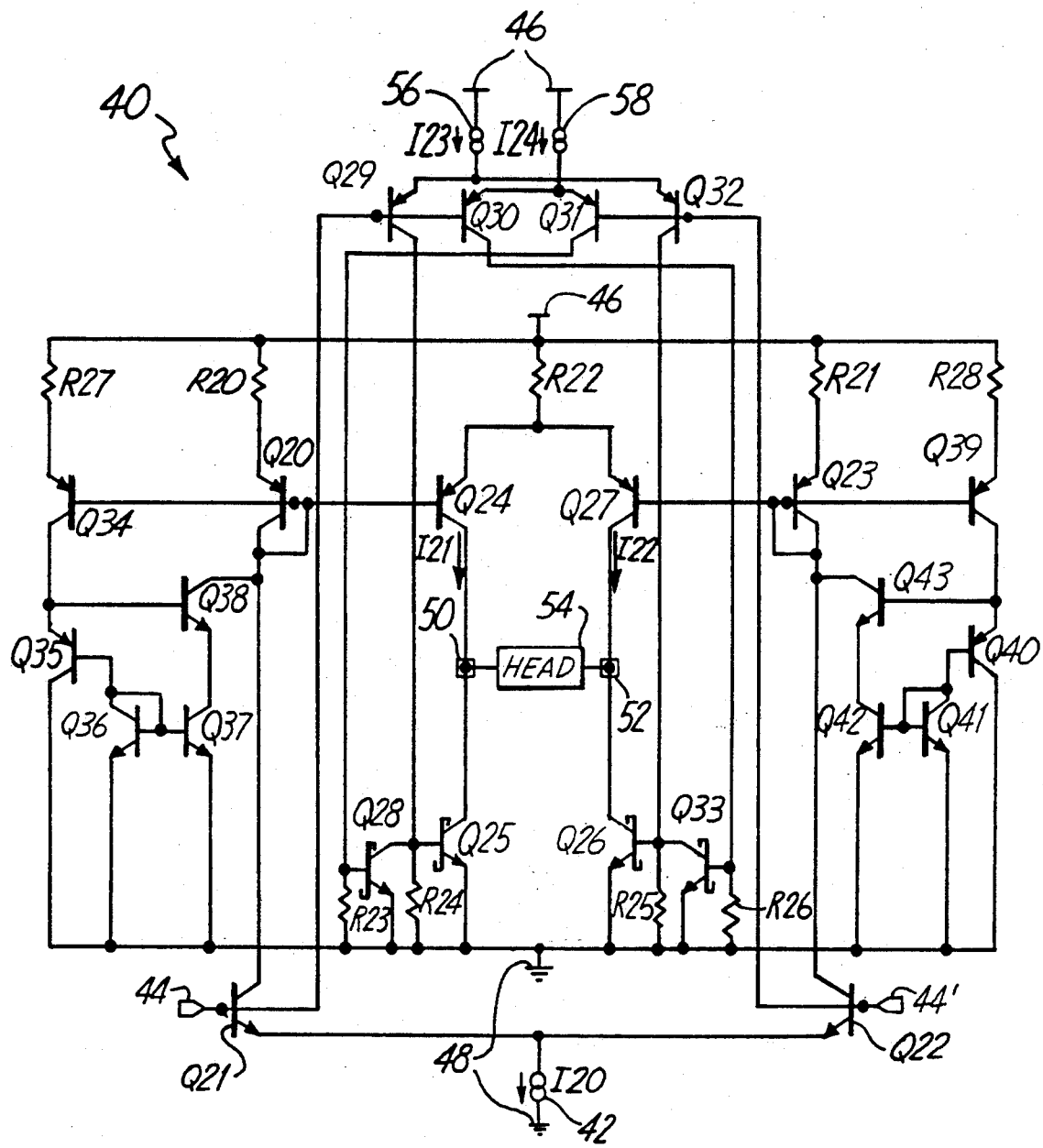
FIG. 3 is a schematic illustration of an alternative write driver circuit in accordance with the present invention.

FIG. 3 is a schematic illustration of write preamplifier 40 and is an alternative embodiment of the present invention. Like write preamplifier 10, write preamplifier 40 includes a predriver current generating circuit, a predriver circuit, and a write driver circuit. In addition, write preamplifier 40 includes an alternative bias circuit and a base compensation circuit for the current mirrors in the preamplifier.

The predriver current generating circuit is connected between the predriver circuit and voltage supply terminal 48. The predriver current generating circuit includes current source 42 which is similar to predriver current generating circuit 12 shown in FIG. 1. The circuit produces predriver current I20 which is driven through the predriver circuit. Current source 42 enables and disenables preamplifier 40.

The predriver circuit is connected between voltage supply terminal 46 and the predriver current generating circuit (current source 42). The predriver circuit includes resistors R20 and R21, current sensing transistors Q20 and Q23, current control transistors Q21 and Q22, and data input terminals 44 and 44'.

Transistors Q20–Q23 each have an emitter, a base, and a collector. In the predriver circuit, resistor R20 is connected between voltage supply terminal 46 and the emitter of current sensing transistor Q20. Current sensing transistor Q20 is diode-connected with its base connected to its collector. The collector of current sensing transistor Q20 is also connected to the collector of current control transistor Q21. The base of current control transistor Q21 is connected to data input terminal 44 and the emitter is connected to the emitter of current control transistor Q22. The emitters of both current control transistor Q21 and current control transistor Q22 are connected to current source 42.

The base of current control transistor Q22 is connected to data input terminal 44' and the collector is connected to the collector of current sensing transistor Q23. Current sensing transistor Q23 is a diode-connected transistor with its base connected to its collector. Resistor R21 is connected between the emitter of current sensing transistor Q23 and voltage supply terminal 46. Data input terminals 44 and 44' receive complementary data signals.

The predriver circuit includes a first and second predriver current path. The first predriver current path includes resistor R20, current sensing transistor Q20, and current control transistor Q21. The second predriver current path includes resistor R21, current sensing transistor Q23, and current control transistor Q22. Current sensing transistors Q20 and Q23 are PNP-type transistors, while current control transistors Q21 and Q22 are NPN-type transistors. The predriver circuit drives predriver current I20, which is generated by current source 42, in either the first predriver current path or the second predriver current path as a function of the data input signal.

For example, if the data input signals on data input terminal 44 are HIGH and the data input signals on data input terminal 44' are LOW, current control transistor Q21 will be ON and current control transistor Q22 will be OFF. Therefore, predriver current I20 will be driven in the first predriver current path defined by resistor R20, current sensing transistor Q20, and current control transistor Q21. Similarly, if the data input signals on data input terminal 44 are LOW and the data input signals on data input terminal 44' are HIGH, current control transistor Q22 will be ON and current control transistor Q21 will be OFF. Predriver current I20 will then flow through the second predriver current path defined by resistor R21, current sensing transistor Q23 and current control transistor Q22.

The write driver circuit is connected between voltage supply terminal 46 and voltage supply terminal 48. The write driver circuit includes resistor R22, pull-up transistors Q24 and Q27, pull-down transistors Q25 and Q26, first and second head contact terminals 50 and 52, and magnetic head 54. Transistors Q24–Q27 each have an emitter, a base, and a collector.

Resistor R22 is connected between voltage supply terminal 46 and the emitters of pull-up transistors Q24 and Q27. The base of pull-up transistor Q24 is connected to the base of current sensing transistor Q20 of the predriver circuit. The collector of pull-up transistor Q24 is connected to head contact terminal 50. Head contact terminal 50 is connected to magnetic head 54 and to the collector of pull-down transistor Q25. The emitter of pull-down transistor Q25 is connected to voltage supply terminal 48. The emitter of pull-down transistor Q26 is also connected to voltage supply terminal 48. The collector of pull-down transistor Q26 is connected to head contact terminal 52. Head contact terminal 52 is connected to magnetic head 54 and to the collector of pull-up transistor Q27. The base of pull-up transistor Q27 is connected to the base of current sensing transistor Q23 of the predriver circuit.

The write driver circuit has a first and a second write current path. The first write current path drives write current I21 through resistor R22, pull-up transistor Q24, head contact terminal 50, magnetic head 54, head contact terminal 52, and pull-down transistor Q26. The second write current path drives write current I22 through resistor R22, pull-up transistor Q27, head contact terminal 52, magnetic head 54, head contact terminal 50 and pull-down transistor Q25.

The first write current path and the first predriver current path are connected by pull-up transistor Q24 and current sensing transistor Q20. Transistors Q24 and Q20 are connected in a current mirror configuration such that the predriver current flowing through the collector of sensing transistor Q20 is mirrored into write current I21 of the first write driver current path through the collector of pull-up transistor Q24. When transistors Q24 and Q20 are matched, the collector currents are substantially equal. Thus, predriver current I20 will be substantially similar to write current I21. By scaling the emitter areas of transistors Q20 and Q24, various ratios between predriver current I20 and write current I21 may be achieved. For example, write current I21 may be ten times that of predriver current I20. By amplifying the predriver current, power will not be wasted in the predriver circuit in order to establish a sufficient write current to properly operate magnetic head 54.

The second predriver current path and second write current path are also connected together in a current mirror configuration. Current sensing transistor Q27 and pull-up transistor Q23 are connected as a mirror configuration. Thus, when predriver current I20 flows through the second predriver current path, the current is mirrored into the second write current path.

When the data signals on data input terminal 44 are HIGH, and the data signals on data input terminal 44' are LOW, predriver current I20 flows through the first predriver current path. Predriver current I20 is mirrored into the first write current path through the current mirror defined by transistors Q20 and Q24. Since the data input signals at input terminal 44 are LOW, transistors Q22, Q24, and Q27 are OFF. Thus, no predriver current is mirrored into the second write current path. Therefore, write current I21 flows through magnetic head 54 in a first direction through transistors Q11 and Q26.

Similarly, when the data input signals at data input terminal 44' are HIGH and the data input signals at data input terminal 44 are LOW, predriver current I20 will flow through the second predriver current path. Predriver current I20 will be mirrored into the second write current path causing write current I22 to flow through magnetic head 54 in a second direction, opposite to the first direction.

Preamplifier 40 also includes an alternative bias circuit for pull-down transistors Q25 and Q26. The alternative bias circuit is connected between voltage supply terminals 46 and 48. The alternative bias circuit includes current source 56, current source 58, resistors R23–R26, and transistors Q28–Q33. Transistors Q28–Q33 each have an emitter, a base and a collector.

In the alternative bias circuit, resistor R23 is connected between voltage supply terminal 48 and the base of transistor Q28. The base of transistor Q28 is connected to the collector of transistor Q31. The emitter of transistor Q28 is connected to voltage supply terminal 48. The collector of transistor Q28 is connected to resistor R24, to the collector of transistor Q29, and to the base of pull-down transistor Q25. Resistor R24 is also connected to voltage supply terminal 48.

The emitter of transistor Q29 is connected to current source 56 and to the emitter of transistor Q32. The base of transistor Q29 is connected to the base of current control transistor Q21 and to the base of transistor Q30. The collector of transistor Q30 is connected to the base of transistor Q33 and to resistor R26. The emitter of transistor Q30 is connected to current source 58 and to the emitter of transistor Q31. The base of transistor Q31 is connected to the base of transistor Q32 and to the base of current control transistor Q22. The collector of transistor Q32 is connected to the base of pull-down transistor Q26, to resistor R25 and to the collector of transistor Q33. Resistor R25 is also connected to voltage supply terminal 48. The base of transistor Q33 is connected to resistor R26 and the emitter is connected to voltage supply terminal 48. Resistor R26 is also connected to voltage supply terminal 48.

In the alternative bias circuit, transistors Q28, Q29, and Q31 control the base voltage of pull-down transistor Q25 in the write driver circuit. Similarly, transistors Q30, Q32, and Q33 control the base voltage of pull-down transistor Q26 of the write driver circuit.

For example, when the data input signals are HIGH at data input terminal 44 and LOW at data input terminal 44', predriver current I20 flows through the first predriver current path (transistors Q20 and Q21). As discussed above, current I20 is mirrored into write driver current I21 in the first write current path (transistors Q24 and Q25). With data input terminal 44 HIGH, the bases of transistors Q29 and Q30 are HIGH. Since both these transistors are PNP-type transistors, they will both be OFF. Since transistor Q29 is OFF, resistor R24 will pull the base of pull-down transistor Q25 LOW to turn OFF pull-down transistor Q25. Since transistor Q30 is OFF, resistor R26 will pull the base of transistor Q33 LOW to turn OFF transistor Q33.

With data input terminal 44' LOW, the bases of transistors Q31 and Q32 are LOW. Since transistors Q31 and Q32 are PNP-type transistors, they will be ON. With transistor Q29 OFF and transistor Q32 ON, current I23 will flow through resistor R26 to bias the base of pull-down transistor Q26 HIGH and turn transistor Q25 ON. With transistor Q30 OFF and transistor Q31 ON, current I24 will flow through resistor R23 to bias the base of transistor Q28 HIGH and turn transistor Q28 ON. Transistor Q28 pulls the base of pull-down transistor Q25 LOW to turn transistor Q25 OFF. Thus, the bases of pull-down transistors Q25 and Q26 are controlled by the data input signals applied to terminal 44 and 44'. The bias circuit synchronizes the switching of transistors Q25 and Q26 to avoid current spiking and overshoot at magnetic head 54.

Preamplifier 40 further includes a base compensation circuit for the current mirrors (formed by transistors Q20 and Q24 and by transistors Q23 and Q27) between the predriver circuit and the write driver circuit. The current mirrored into the write driver circuit is not identical with the predriver current I20. Rather, the mirrored current is reduced by the base currents of the current mirror transistors. The base compensation circuits compensate for the base current lost in each of the current mirrors.

The base compensation circuit for the current mirror formed by transistors Q20 and Q24 includes resistor R27 and transistors Q34-Q38. Transistors Q34-Q38 each have an emitter, a base and a collector. The base of transistor Q34 is connected to the base of current sensing transistor Q20 of the predriver circuit. Resistor R27 is connected between the emitter of transistor Q34 and voltage supply terminal 46. The collector of transistor Q34 is connected to the emitter of transistor Q35 and to the base of transistor Q38. The collector of transistor Q35 is connected to voltage supply terminal 48. The base of transistor Q35 is connected to the collector of transistor Q36. Transistor Q36 is a diode-connected transistor with its collector connected to its base. The emitter of transistor Q36 is connected to voltage supply terminal 48. The base of transistor Q36 is connected to the base of transistor Q37. The emitter of transistor Q37 is connected to voltage supply terminal 48 and the collector is connected to the emitter of transistor Q38. The collector of transistor Q38 is connected to the collector of current sensing transistor Q20 of the predriver circuit.

The advantage of the alternative bias circuit for pull-down transistors Q25 and Q26 is that constant current sources 56 and 58 provide a large enough switching current (I23 and I24) to rapidly switch pull-down transistors Q25 and Q26 independent of the write current or the predriver current.

The embodiment shown in FIG. 3 also includes base compensation circuits for the current mirrors formed by transistors Q20 and Q24 and by transistors Q23 and Q27. The current mirrors are not ideal since a portion of the current to be mirrored is lost into the bases of transistors Q20 and Q23. The base currents of transistors Q20 and Q23 are duplicated, mirrored, and then fed back to the bases of transistors Q20 and Q23 to provide the base current compensation. The amount of base current lost in the current mirrors is minimal. Therefore, the current in the predriver current paths (transistors Q20, Q21, and Q22, Q23) will be substantially the same as the current mirrored into the write current paths (transistors Q24, Q26, and Q25, Q27).

Transistors Q34 through Q38 form a compensation feedaback loop provide base current compensation to the Q20, Q24 current mirror. Transistors Q20 and Q34 form a current mirror to mirror the collector current of transistor Q20 into the collector of transistor Q34. The collector current of transistor Q34 primarily flows through the collector and emitters of transistor Q35. Since the currents flowing through the collector and emitter of transistor Q35 are approximately equal to the currents flowing through the collectors and emitters of transistors Q34 and Q20, the base current of transistor Q35 is approximately equal to the base current of transistors Q34 and Q20. The base current of transistor Q35 (duplicated base current of transistor Q20) is mirrored into the collector of transistor Q37 through a current mirror formed by transistors Q36 and Q37. The collector current of transistor Q37 (duplicated base current of transistor Q20) is fed back into the base of transistor Q20 through transistor Q38. The base current of transistor Q20 no longer subtracts from the accuracy of the current mirror formed by transistors Q20 and Q24. Transistors Q36 and Q37 form a compensation mirror within the base current compensation feedback loop.

The connection of transistor Q38 between the emitter of transistor Q35, the collector of transistor Q37, and the base and collector of transistor Q20 increases the accuracy of the base compensation circuit by increasing the accuracy of the current mirror formed by transistors Q36 and Q37. Without transistor Q38, the collector of transistor Q37 would be connected to the base of transistor Q20. In this configuration, the voltages at the bases and emitters of transistors Q36 and Q37 would be equal but the voltages at the collectors may not be equal. Therefore, the current mirrrored into the collector of transistor Q37 may not be equal to the collector current of transistor Q36.

With the configuration shown in FIG. 3, transistor Q38 clamps the collector of transistor Q37 at the same voltage as the collector of transistor Q36. The collector voltage of transistor Q36 is given by the equation below:

$$V_cQ36 = V_bQ36 - GROUND + V_{be}Q36 \qquad \text{Eq. 5}$$

where:
$V_cQ36$, $V_bQ36$ are the collector and base voltages, respectively, of transistor Q36;
GROUND is the voltage applied to voltage supply terminal 48; and
$V_{be}Q36$ is the voltage drop across the base-emitter junction of transistor Q36 (about 1 diode drop).

The collector voltage of transistor Q37 is given by the equation below:

$$V_cQ37 = V_{be}Q36 + V_{eb}Q35 - V_{be}Q38 \qquad \text{Eq. 6}$$

where:
$V_cQ37$ is the collector voltage of transistor Q37;
$V_{be}Q36$ is the base-emitter voltage drop of transistor Q36;
$V_{eb}Q35$ is the emitter-base voltage drop of transistor Q35; and
$V_{be}Q38$ is the base-emitter voltage drop across transistor Q38.

If the voltage drops across the base-emitter junctions of transistors Q35, Q36, and Q38 are equal ($V_{be}Q36$), then Equation 6 reduces to the following:

$$V_cQ37 = V_{be}Q36 \qquad \text{Eq. 7}$$

Therefore:

$$V_cQ37 = V_cQ36 \qquad \text{Eq. 8}$$

Since the base and collector voltages of transistors Q36 and Q37 are equal, then the current mirror formed by transistors Q36 and Q37 is extremely accurate and provides a more accurate base compensation for the current mirror formed by transistors Q20 and Q24.

Further, the current mirror formed by transistors Q36 and Q37 are insensitive to voltage supply variations since the collector voltages of transistors Q36 and Q37 are maintained equal regardless of variances in the voltage supply.

The base compensation circuit for the current mirror formed by transistors Q23 and Q27 includes resistor R28 and transistors Q39–Q43. Transistors Q39–Q43 each have an emitter, a base and a collector. The base of transistor Q39 is connected to the base of current sensing transistor Q23 of the predriver circuit. Resistor R28 is connected between the emitter of transistor Q39 and voltage supply terminal 46. The collector of transistor Q39 is connected to the base of transistor Q43 and to the emitter of transistor Q40. The base of transistor Q40 is connected to the collector of transistor Q41. The collector of transistor Q40 is connected to voltage supply terminal 48. Transistor Q41 is a diode-connected transistor with its base connected to its collector. The emitter of transistor Q41 is connected to voltage supply terminal 48. The base of transistor Q41 is connected to the base of transistor Q42. The emitter of transistor Q42 is connected to voltage supply terminal 48 and the collector is connected to the emitter of transistor Q43. The collector of transistor Q43 is connected to the collector of current sensing transistor Q23 of the predriver circuit. The base compensation circuit for the current mirror formed by transistors Q23 and Q27 operates in the same manner discussed above for the current mirror formed by transistors Q20 and Q24.

Although the present invention has been described with reference to preferred embodiments, workers skilled in the art will recognize that changes may be made in form and detail without departing from the spirit and scope of the invention. For example, other current mirror configurations for mirroring the predriver current into the write driver circuit can be employed without departing from the spirit and scope of the present invention. Similarly, other base compensation and transistor biasing schemes can be used in accordance with the present invention.

What is claimed is:

1. A base compensation circuit configured for connection to a first current mirror that has lost base current, the base compensation circuit comprising:
a compensation mirror coupled in a feedback loop to the first current mirror, wherein the compensation mirror includes a first current sensing transistor which senses the lost base current and includes a first current duplicating transistor which is coupled to the first current sensing transistor and generates a compensation current in response to the sensed lost base current that is fed back into the first current mirror to compensate for the lost base current; and
a voltage clamp coupled to the first current sensing transistor and the first current duplicating transistor, which maintains approximately equal collector-base voltages in the first current sensing transistor and the first current duplicating transistor to increase accuracy of the compensation mirror.

2. The base compensation circuit of claim 1 wherein:
the first current mirror includes a second current sensing transistor and a second current duplicating transistor which have collectors, bases and emitters, with the base of the second current duplicating transistor being connected to the base and collector of the second current sensing transistor; and
the base compensation circuit further comprises a third current duplicating transistor having a collector, a base and an emitter, with the base of the third current duplicating transistor being connected to the base of the second current duplicating transistor and to the base and collector of the second current sensing transistor.

3. The base compensation circuit of claim 2, wherein:
the first current sensing transistor and the first current duplicating transistor have collectors, bases and emitters, with the base of the first current duplicating transistor being connected to the base and collector of the first current sensing transistor; and
the voltage clamp includes a first base-emitter junction coupled between the third current duplicating transistor and the collector of the first current sensing transistor and includes a second base-emitter junction coupled to the first base-emitter junction, between third duplicating transistor and the collector of the first current duplicating transistor.

4. The base compensation circuit of claim 3, wherein the emitter of the first current sensing transistor is connected to the emitter of the first current duplicating transistor.

5. The base compensation circuit of claim 3, wherein:
the first base-emitter junction comprises a pnp-type transistor having a collector, a base and an emitter, with the emitter being coupled to the third current duplicating transistor and to the second base-emitter junction, the base being coupled to the collector and base of the first current sensing transistor and to the base of the first current duplicating transistor, and the collector being coupled to the emitters of the first current sensing transistor and the first current duplicating transistor such that the pnp-type transistor generates a base current that is representative of the lost base current in the first current mirror and is applied to the first current sensing transistor.

6. The base compensation circuit of claim 3, wherein:
the second base-emitter junction comprises an npn-type transistor having a collector, a base and an emitter, with the base being coupled to the third current duplicating transistor and to the first base-emitter junction, the emitter being coupled to the collector of the first current duplicating transistor, and the collector being coupled to the base and collector of the second current sensing transistor and to the base of the second current duplicating transistor, wherein the npn-type transistor feeds the compensation current, which is developed by the first current duplicating transistor, back into the bases of the second current sensing transistor and the second current duplicating transistor.

7. A base-current compensated current mirror comprising:
a first current sensing transistor having a collector, a base and an emitter, wherein the first current sensing transistor senses a current applied to the collector;
a first current duplicating transistor having a collector, a base and an emitter, with the base being connected to the base and collector of the first current sensing transistor to generate a collector current in the first current duplicating transistor that is proportional to the collector current in the first current sensing transistor, wherein base current is lost in the bases of the first current sensing transistor and the first current duplicating transistor; and
a base compensation feedback loop connected to the bases of the first current sensing transistor and the first current duplicating transistor, comprising:
a compensation mirror which generates a compensation current that is proportional to the lost base current, wherein the compensation mirror feeds the compensation current back into the bases of the first current sensing transistor and the first current duplicating transistor to compensate for the lost base current; and
a voltage clamp coupled to the compensation mirror, which maintains approximately equal collector-base voltages in the compensation mirror and thereby increases accuracy of the compensation mirror.

8. The base-current compensated current mirror of claim 7 wherein the base compensation feedback loop further comprises:

a second current duplicating transistor having a collector, a base and an emitter, with the base of the second current duplicating transistor being connected to the base of the first current duplicating transistor and to the base and collector of the first current sensing transistor.

9. The base-current compensated current mirror of claim 8, wherein:
the compensation mirror comprises a second current sensing transistor having a collector, a base and an emitter and comprises a third current duplicating transistor having a collector, a base and an emitter, with the base of the third current duplicating transistor being connected to the base and collector of the second current sensing transistor; and
the voltage clamp comprises a first base-emitter junction coupled between the second current duplicating transistor and the collector of the second current sensing transistor and comprises a second base-emitter junction coupled to the first base-emitter junction, between second duplicating transistor and the collector of the third current duplicating transistor.

10. The base-current compensated current mirror of claim 9, wherein the emitter of the second current sensing transistor is connected to the emitter of the third current duplicating transistor.

11. The base-current compensated current mirror of claim 9, wherein:
the first base-emitter junction comprises a pnp-type transistor having a collector, a base and an emitter, with the emitter being coupled to the second current duplicating transistor and to the second base-emitter junction, the base being coupled to the collector and base of the second current sensing transistor and to the base of the third current duplicating transistor, and the collector being coupled to the emitters of the second current sensing transistor and the third current duplicating transistor such that the pnp-type transistor generates a base current that is representative of the lost base current in the first current sensing transistor and the first current duplicating transistor, wherein the base current generated by the pnp-type transistor is applied to the second current sensing transistor.

12. The base-current compensated current mirror of claim 9, wherein:
the second base-emitter junction comprises an npn-type transistor having a collector, a base and an emitter, with the base being coupled to the second current duplicating transistor and to the first base-emitter junction, the emitter being coupled to the collector of the third current duplicating transistor, and the collector being coupled to the base and collector of the first current sensing transistor and to the base of the first current duplicating transistor, wherein the npn-type transistor feeds the compensation current, which is developed by the third current duplicating transistor, back into the bases of the first current sensing transistor and the first current duplicating transistor.

13. A method of compensating for lost base current in a first current mirror, comprising;
providing a compensation current mirror with a current sensing transistor and a current duplicating transistor which have collector-base voltages;
sensing the lost base current with the current sensing transistor;

duplicating the sensed lost base current with the current duplicating transistor;

clamping the collector-base voltages of the current sensing transistor and the current duplicating transistor to approximately the same voltage potential; and feeding the duplicated lost base current back into the first current mirror to compensated for the lost base current.

14. A write driver comprising for driving a magnetic head in a magnetic storage system, the write driver comprising:

first and second voltage supply terminals;

first and second head contact terminals for connection to the magnetic head;

a data input for receiving data input signals;

means for generating a predriver current, which is connected to the second supply terminal;

a predriver circuit connected to the data input and having first and second predriver current paths connected between the first supply terminal and the means for generating a predriver current, wherein the predriver circuit directs the predriver current through the first and second predriver current paths as a function of the data input signals;

a write driver circuit having first and second write current paths connected between the first and second supply terminals and connected across the head contact terminals, wherein the first write current path directs current through the head contact terminals in a first direction and the second write current path directs current through the head contact terminals in a second direction, opposite to the first direction;

means connected between the predriver circuit and the write driver circuit for mirroring the predriver current in the first and second predriver current paths into the first and second write driver current paths, respectively; and a base compensation feedback loop connected to the means for mirroring to compensate for lost base current in the means for mirroring, comprising:

a compensation mirror which generates a compensation current that is proportional to the lost base current, wherein the compensation mirror is connected to the means for mirroring to feed the compensation current back into the means for mirroring to compensate for the lost base current; and a voltage clamp coupled to the compensation mirror, which maintains approximately equal collector-base voltages in the compensation mirror to increase accuracy of the compensation mirror.

* * * * *

UNITED STATES PATENT AND TRADEMARK OFFICE
CERTIFICATE OF CORRECTION

PATENT NO. : 5,282,094

DATED : January 25, 1994

INVENTOR(S) : TUAN V. NGO

It is certified that error appears in the above-identified patent and that said Letters Patent is hereby corrected as shown below:

Col. 1, line 59, delete "di/dt - V/L", insert --di/dt = V/L--

Col. 8, line 9, delete "and Q9", insert --and Q8--

Col. 8, line 21, delete "VCC - [VR6 = $V_{sat}$(Q6) = $V_{sat}$(Q8)]", insert --VCC - [VR6 + $V_{sat}$(Q6) + $V_{sat}$(Q8)]--

Col. 8, line 45, delete "there", insert --their--

Col. 14, line 38, delete "feedaback", insert --feedback--

Col. 14, line 38, after "loop", insert --to--

Col. 15, line 36, delete "$V_e$Q37 - $V_{be}$Q36", insert --$V_e$Q37 = $V_{be}$Q36--

Signed and Sealed this

Thirteenth Day of September, 1994

Attest:

BRUCE LEHMAN

*Attesting Officer*   *Commissioner of Patents and Trademarks*